United States Patent Office 3,221,257
Patented Nov. 30, 1965

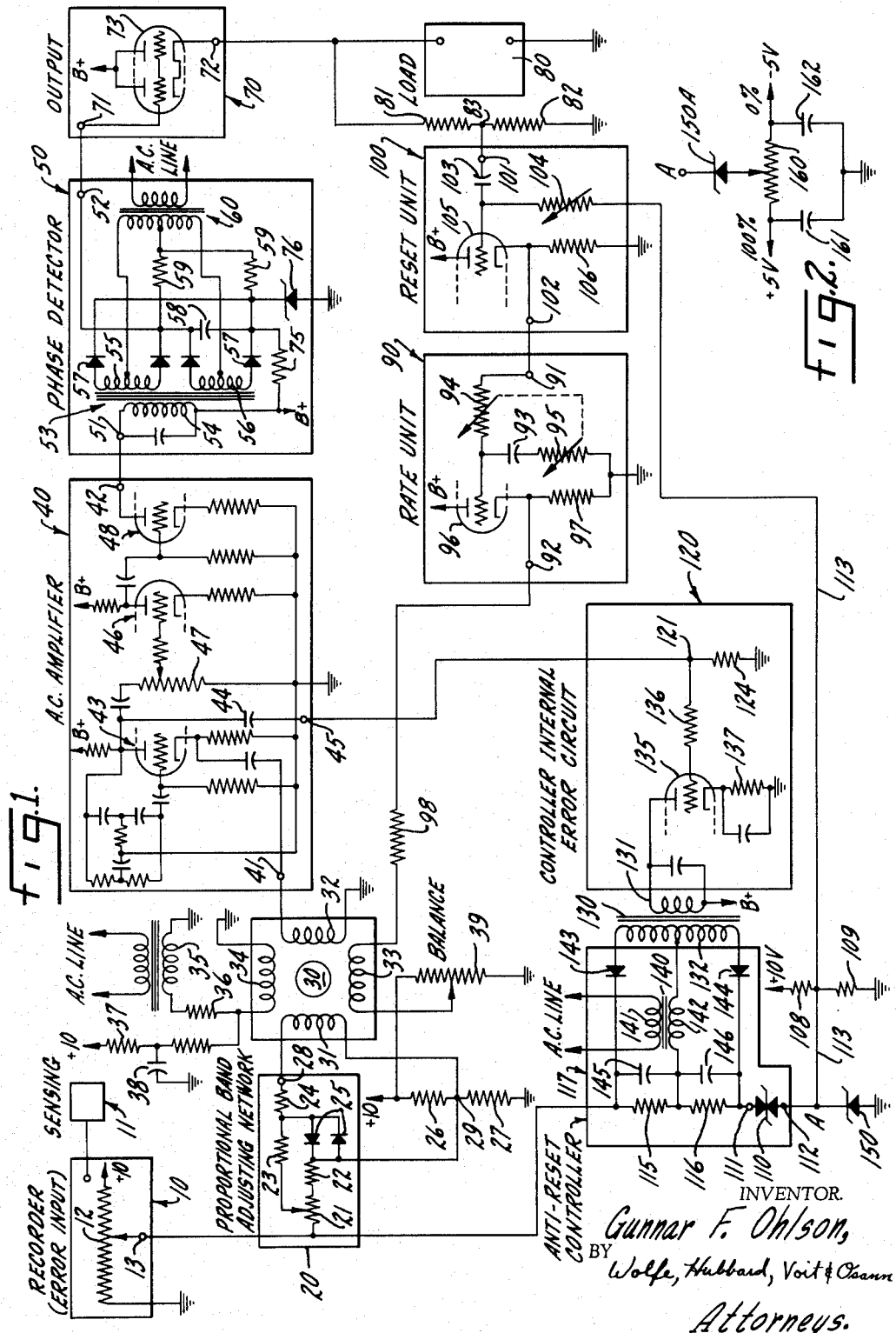

3,221,257
AUTOMATIC CONTROL CIRCUIT UTILIZING INPUT AND INTERNAL SIGNALS CONTROLLING RESET FOR PROVIDING IMPROVED STEP RESPONSE
Gunnar F. Ohlson, Rockford, Ill., assignor to Barber-Colman Company, Rockford, Ill., a corporation of Illinois
Filed Feb. 15, 1963, Ser. No. 258,765
12 Claims. (Cl. 328—69)

The present invention relates to means for controlling a condition and more specifically to an improved version of the control arrangement capable of accurate control in the face of large step changes of the set point or changes in the condition from the set point disclosed in co-pending application Serial No. 112,910 filed May 26, 1961.

In the automatic control of a condition by a control circuit having proportional action plus integral (i.e., reset) action, and either with or without derivative action, parameters are chosen to produce optimum control characteristics in the vicinity of the set point. However, such a system will usually not operate satisfactorily in the face of large step changes of the set point or changes in the condition from the set point, typically overshooting the set point to a degree depending upon the amount of the change which has been made. The problem of overshoot is encountered, for example, in a batch heating process where a batch must be brought up to a set temperature promptly from ambient condition. Overshooting may be highly undesirable since the material in the batch may be subject to unwanted chemical changes upon exceeding a critical temperature. Consequently, it is a common practice to bring a batch up to temperature under manual control and with care and judgment being exercised by the operator to avoid overshoot, restoring the system to automatic control after the desired condition has been reached. Additionally, if the reset or integral action is begun at the limits of the input error span rather than at the limits of the proportional band, operation of the system is not satisfactory since preintegration occurs which results in a delaying of the proportional action. Such a condition is likely to occur when the proportioning band is less than the input error span, care must be taken to see that the reset action is begun at the limits of the proportioning band rather than at the limits of the input error span.

Though this application relates to an improved version of the control arrangement disclosed in the above-mentioned co-pending application, it is to be understood that the control arrangement in the co-pending application is clearly operable for any desired input error span and for any desired proportional band. However, the improved version of the control arrangement disclosed hereinafter allows for improved control of a desired condition when the input error span is greater than the limits of the proportional band.

A primary object of this invention is to provide an improved automatic control system for controlling reset action in the face of large step changes in the set point such that reset action is inhibited until the limits of the proportioning band are reached. In this connection, an object of this invention is to provide a control system of this type characterized in that preintegration is inhibited by beginning the reset action at the limits of the proportioning band rather than at the limits of the input error span.

Another object of this invention is to provide an improved control system which has optimum control characteristics under normal "on line" conditions and which is, nevertheless, capable of responding to a large change in the set point, such as encountered when starting up a batch process, without overshoot, within a minimum period of time, and under full automatic control, characterized in that preintegration is inhibited. In this connection, another object of the present invention is to provide an improved automatic controller of this type which is particularly well suited to a batch process and which does not require manual supervision during start-up nor the making of any adjustments to accommodate the controller to the particular function being performed. It is a more specific object to provide an improved control arrangement which adapts itself to processes having widely different time constants and which is not restricted to operation within a particular range of time constants.

More specifically, an object of the present invention is to provide an improved automatic control system which avoids the problems of "reset windup" experienced with conventional control systems and which has provisions for "inhibiting" the reset function when certain criteria are met, characterized in that preintegration (i.e., prereset) is inhibited.

Still another object of this invention is to provide an improved automatic control system in which the reset action is inhibited progressively in accordance with the algebraic summation of input error and controller internal error. A related object of the present invention is to provide an improved automatic control system in which the reset function is progressively inhibited or uninhibited in joint response to input error and internal error without any abrupt transition which may give rise to instability or hunting. Additionally, an object of this invention is to provide an automotic control system having means for producing an anti-reset signal which varies in accordance with the algebraic summation of input error and controller internal error and which anti-reset signal is capable of inhibiting the reset action until the limits of the proportioning band are reached. More specifically, an object is to produce a progressively developed anti-reset signal for the purpose of inhibiting the reset signal voltage when certain conditions are met until the limits of the proportioning band are reached.

Still another object of the present invention is to provide an improved automatic controller having provisions for eliminating the condition of reset windup upon the satisfying of certain conditions, but which does not inhibit reset action when such action should be instituted. In this connection, another object of the present invention is to provide means for inhibiting the reset action under certain conditions to avoid reset windup but which, nevertheless, does not affect the ordinary operation of the circuit so that the normal reset action is available under the "on line" conditions when the limits of the proportioning band are reached.

Still another object of this invention is to provide an improved automatic controller for inhibiting the reset action under certain conditions characterized in that means are provided for compensating for changes in the normal output level. Accordingly, an object of this invention is to provide means for changing the reset action operating level when changes are made in the normal output level so as to compensate for such changes.

A general object of the present invention is to provide an improved automatic control device which is more reliable than the electromechanical systems of conventional type and in which the various control functions may be accomplished electronically so that a high degree of compactness, in addition to reliability, may be obtained.

Other objects and advantages of the invention will become apparent upon reading the attached detailed description and upon reference to the drawings, in which:

FIGURE 1 is a schematic circuit diagram illustrating an automatic control system constructed in accordance with the principles of the present invention and having functional subassemblies outlined for identification;

FIG. 2 shows an alternative form of a reference voltage source usable in the circuit of FIG. 1.

While the invention has been described in connection with certain preferred embodiments, it is to be understood that the invention is not to be limited to the disclosed embodiments, but, on the contrary, the invention is intended to cover the various modifications and equivlant arrangements included within the spirit and scope of the appended claims.

Turning now to FIGURE 1 there is shown a schematic diagram of an automatic controller constructed in accordance with the present invention. It includes an input device or circuit here shown as comprising a recorder 10 for recording the controlled condition, the condition being sensed by a sensing device 11. The recorder is of conventional manufacture including an input transmitting slide wire 12 and having an output terminal 13. Means (not shown) are included within the recorder for adjusting the set point so that when the condition is at the set point a voltage of five volts exists at the output terminal 13. Thus, the slidewire 12 in the present instance forms a means to generate an input error signal which varies positively or negatively about a five volt level according to the sign and extent of the difference between the set point and the controlled condition. Variations above and below the set point are effective to produce changes in controller input error voltage within the range of say, plus 10 volts to 0 volt. Any other sensing device capable of producing 0 to 10 volts output may be substituted for the recorder. While the device to be described is capable to controllingf any condition, it may be assumed, in order to facilitate understanding, that the condition to be controlled is that of temperature, that the sensing element 11 is capable of detecting changes in temperature, and the means are provided at the output of the control circuit for changing the amount of heat, as the "manipulated variable," which is admitted to the vessel or other space being controlled.

For the purpose for adjusting the proportional band, a proportional band adjusting network 20 is provided having a potentiometer 21, resistors 22, 23, 24 and diodes 25. The return connection from the proportional band adjusting network is made to the center of a voltage divider consisting of resistors 26, 27 so that a net output voltage for application to the remainder of the control circuit appears at output terminals 28, 29.

For the purpose of converting the direct voltage signal at terminals 28, 29 to an A.-C. signal having proportional magnitude and of a phasing which depends upon the polarity of the D.-C. signal, a magnetic modulator 30 is provided. The latter includes an input coil 31 and an output coil 32, a negative feedback winding 33, and a biasing winding 34. The biasing winding is supplied with A.-C. excitation and D.-C. bias. The A.-C. excitation is obtained from a transformer winding 35 coupled to the A.-C. supply line, a resistor 36 being provided in series therewith. The D.-C. bias is obtained from the ten volt D.-C. supply via a resistor 37 having a by-pass capacitor 38.

The function of the feedback winding 33 will be made clear as the discussion proceeds. It will suffice to say that a direct voltage is applied thereto from a feedback loop which is coupled to the output of the control circuit. The end of the winding 33 is connected to the slider of a balancing potentiometer 39 in order to correct for minor unbalance inherent in the modulator and other manufactured components. For physical details of the magnetic modulator, reference is made to literature covering such devices since magnetic modulators are standard commercially available devices.

To amplify the A.-C. output of the magnetic modulator, an A.-C. amplifier 40 is provided having an input terminal 41 and an output terminal 42. The first stage of the amplifier comprises a triode 43 having a grounded grid connection and with the signal being injected in the cathode circuit. Coupled to the plate terminal of the input tube 43 by a capacitor 44 is an auxiliary output connection 45. It will suffice for the present to say that the signal at the auxiliary output terminal is employed as a measure of the signal level of the amplifier 40, which is proportional to controller internal error, and the manner in which such signal is utilized in practicing the invention will be covered at a later point. The output of the first triode 43 is coupled to a second triode 46 via a gain control 47. Finally the output of the second stage is fed to a third triode 48 which is connected to the amplifier output terminal 42. Further details of the amplifier 40 will be apparent to those skilled in the art, the purpose of the amplifier being basically to provide an A.-C. output signal which is an amplified version of the input signal and avoiding the problems inherent in the use of a D.-C. amplifier.

In order to convert the A.-C. output from the amplifier back to a D.-C. signal of corresponding amplitude and of a polarity which depends upon the phase, a phase detector 50 is used having an input terminal 51 and an output terminal 52. Included within the phase detector is a transformer 53 having an input winding 54 and balanced output windings 55, 56. Each of the windings 55, 56 is center tapped and provided with rectifying diodes 57, the rectified outputs being fed into a common output circuit consisting of a capacitor 58 and load resistors 59. For reference purposes a transformer 60, coupled to the A.-C. line, is used having balanced secondary windings which are connected respectively to the center taps of the windings 55, 56 of the transformer.

The operation of phase detectors of the type described above is well known to those skilled in the art and the operation need not be described in detail. Suffice it to say that no voltage will be produced at hte output terminals when the reference transformer 60 is energized and in the absence of an input signal. However, when a signal is received at the input terminal 51, the detector is unbalanced in one direction or the other depending upon the phase of the input signal relative to the voltage at the reference transformer. This produces a direct voltage, either positive or negative, at the output terminal 52, the magnitude depending upon the magnitude of the A.-C. input at terminal 51.

For the purpose of providing current amplification, a D.-C. power output stage 70 is provided having an input terminal 71 an an output terminal 72 and utilizing a triode 73, with the input terminal being connected directly to the grid of the triode. Effectively in series with the input of the triode is a source of constant voltage for setting the mid-scale or 50% output voltage of the controller output triode. This constant voltage source is made up of a resistor 75 connected to B+ together with a zener diode 76. It will be noted that the output tube 73 is connected as a cathode follower with the cathode feeding a load device 80. The load device 80 may be any suitable device which is effective to control the manipulated variable in accordance with the magnitude of the signal fed to it. In a typical temperature controlling arrangement for a batch process, the output device 80 may be in the form of an adjustable steam valve having servo means for admitting heat to the controlled space in proportion to the received output signal.

In order to provide a feedback loop around the amplifier, the output terminal 72 of the output tube 73 is provided with a voltage divider consisting of series connected resistors 81, 82 having a feedback output terminal 83. This terminal is coupled, by means to be discussed, to the feedback winding 33 in the magnetic modulator, with the connection having the purpose of employing negative feedback to obtain the desired controller modes which will be explained subsequently.

For the purpose of producing derivative action, commonly referred to as rate correction, a rate unit 90 is interposed in the amplifier feedback loop having an input terminal 91 and an output terminal 92. The rate unit includes a network which comprises a capacitor 93 and resistors 94, 95, with the latter being variable and preferably ganged together in order to permit the usual adjustment of rate action. The output of the network is fed to the grid of a coupling tube 96 which is connected as a cathode follower and which has a cathode resistor 97. A resistor 98 is in series with the output. The effect of the rate unit 90 in the feedback loop is well understood by those skilled in the art and consequently it will suffice to say that it introduces corrective action resulting from abrupt changes in the controlled variable which may occur, for example, upon sudden changes in loading. Thus, in a typical case, any sudden drop in the controlled temperature has the effect of delaying the feedback signal in the feedback loop thereby temporarily permitting a larger error or actuation signal in the amplifier which causes the output device 80 to respond to a greater extent than it would by proportional action alone thereby tending to bring the controlled condition more promptly back to the set point.

In carrying out the present invention, means are provided in the feeedback loop for producing integral or reset action. Thus, a reset unit 100 is used having an input terminal 101 and an output terminal 102. The reset network includes a capacitor 103 and a reset resistor 104 which is adjustable. The output of the network feeds into the input of a coupling tube 105 which is connected as a cathode follower having a cathode resistor 106.

For the purpose of establishing the nominal reference voltage of the reset unit 100 in the feedback loop, the reset resistor 104, which feeds the grid of the tube 105, is connected to a source of reference voltage. In the present instance, this source of reference voltage is the central terminal of a voltage divider consisting of resistors 108, 109. With the ungrounded end of the voltage divider connected to a plus 10 volt D.C. source, it will be apparent that the reference voltage at the center and which is applied to the gird of the tube 105 via the resistor 104 is plus 5 volts. This establishes a central operating point on the tube characteristic curve and consequently determines the voltage which exists at the output terminal 102 under steady state conditions. Normal fluctuations in the feedback signal at terminal 83 of the voltage divider, and which are fed to the input terminal 101, serve to swing the grid voltage above and below the nominal value of 5 volts to produce corresponding time dependent changes in voltage at the output terminal 102.

Viewing the magnetic modulator 30 and the A.C. amplifier 40 as constituting a composite summing amplifier, it will be apparent that the latter has two input elements, i.e., winding 31 which receives the input error signal and winding 33 which receives the feedback signal. The feedback signal, however, includes as one component the reset signal across capacitor 103 as well as a rate signal component and a proportional component, so the system here shown functions with proportional plus rate, plus reset action. The composite amplifier algebraically sums the input error signal and all components in the feed back signal, and thus there exists in the amplifier at terminal 45 an internal error signal which differs from the input error signal in that it is jointly dependent upon and varies as a combined function of the input error signal and the reset signal (and also, in the illustrated case, the rate signal component).

It will be understood that when the control system is operating under "on line" conditions in the vicinity of the control point the incremental contribution of reset will be small as well as alternating in sign since the error is small and alternating in polarity. The reset capacitor 103 and resistance 104 in the reset unit form a voltage divider whose output is time dependent. In terms of the circuit, the voltage at the output of the capacitor 103, and which is applied to the grid of the tube 105, will tend to follow rather closely a rapidly changing voltage at the input terminal 101. However, with a more slowly varying voltage at the input terminal 101, the feedback signal passed through the reset device is altered so that a reduction in negative feedback results in larger overall controller gain. The composite effect is that the controller gain increases with decreasing error frequency so that in the steady state, any value of output that the process may require can be obtained with essentially zero error.

Prior to discussing the action of the reset unit in the face of prolonged changes in the condition as, for example, may occur when a large step change is made in the set point, it is necessary to establish the nominal center point of the range of control. This is the point within the range of the controller where the set point corresponds to the control point and where there is no droop. In a typical system this point may correspond to, say, a fifty percent output condition since, being midway between zero percent output and one hundred percent output, it is the average value. Consequently, in the present system it is desired that the resistors 81, 82 in the voltage divider be so adjusted that under the condition of fifty percent output a voltage exists at the terminal 83 thereon which corresponds to the reference voltage which is applied to the reset unit, namely, five volts.

Thus, it will be apparent that if a large slide wire error exists so that the output of the control circuit persists above the fifty percent output condition for an extended period of time, the voltage at the input terminal 101 of the reset unit will persist at a value above five volts. This causes the reset capacitor 103 to acquire a charge thereby producing a voltage drop across the capacitor, and it is this voltage drop which in essence constitutes the reset signal and normally varies as a time integral function of the error or difference between the set point and the controlled condition. While the operation of the overall circuit, including the features of the present invention, will be covered in detail at a later point, the operation of the reset unit per se may nevertheless be made clear at this point by a simple example. Let it be assumed that a large step change of set point is made in the upward direction with the result that substantially full output is provided at the output of the controller and so that the voltage at terminal 83 of the voltage divider substantially exceeds the normal voltage of five volts. The resulting difference in voltage across the terminals of the capacitor 103 persisting over an extended period causes the capacitor to charge up to a value which is equal to the differential between the voltage at the input terminal and the reference voltage of five volts. Because of the voltage drop across the capacitor 103, the grid voltage is thus returned to the five volt level and the voltage at the output terminal 102 of the reset unit becomes the same as that which normally exists at the fifty percent output condition. Stated in other words, the feedback signal becomes considerably less than that which would normally be applied to the feedback winding 33 of the magnetic modulator under a high load condition. This reduction in feedback signal produces a net output signal from the magnetic modulator which is higher than the value which would normally result from the high load condition. Such reduction in the feedback signal has the effect of shifting the control point upwardly. The effect of such shift is to compensate for droop, causing the control point to more nearly match the set point.

Conversely, where a large step change is made in the downward direction, just the opposite occurs. The load is lightened causing a drop in the voltage at point 83 to below five volts. This causes the capacitor 103 to be charged with opposite polarity so that the voltage which appears at the output 102 of the reset unit becomes greater than the value which it would normally obtain, thereby increasing the amount of feedback and tending to lower the control point. Again the effect is to compensate for droop and to bring the control point into closer accordance with the set point.

Unfortunately, where unusually high or unusually low input error persists over a long period of time, the reset signal, i.e., the voltage existing across the reset capacitor signal level in the amplifier which represents the condition 103, becomes sufficiently high as to prevent proportional and derivative corrective action to take place until the vicinity of the control point is reached. As has been pointed out earlier in the discussion, the reset signal may reach such a high level as to permit an abnormally large signal level in the amplifier which represents the condition of reset windup which persists as long as the internal error signal fed into the amplifier continues to be of the same phase, i.e., as long as the condition is below the set point, and with inevitable overshoot beyond the set point.

In accordance with the present invention, means are provided for effectively inhibiting integral or reset action in accordance with an anti-reset control function which depends upon the magnitudes of the input error or offset and the internal error of the controller, the internal error being determined by the state of magnetization of the controller. More specifically, means are provided for generating an anti-reset signal for inhibiting integral control action which is rendered effective upon the algebraic summation of the input error and the controller internal error exceeding a predetermined level, the amplitude of the anti-reset signal varying in accordance with the algebraic summation.

In the present instance, the anti-reset voltage or reset inhibiting voltage is achieved by providing a gate responsive to the value of the alegbraic summation of the input error and the controller internal error. In the preferred form of the invention, the gate 110 is in the form of a double anode zener diode having an input terminal 111 and an output terminal 112. The output terminal 112 is connected to the central terminal of the reference voltage determining voltage divider consisting of resistors 108 and 109 through a conductor 113, and the input terminal 111 is connected to the output terminal 13 of the input error recorder 10 through a pair of output resistors 115 and 116 of an anti-reset controller 117. A D.-C. voltage signal proportional to the signal passing through the amplifier 40, and hence to the controller internal error, is provided across the resistors 115 and 116. Thus, the input terminal 111 of the zener diode 110 is connected in series with the signal representative of the input error and the signal representative of controller internal error so that the voltage applied to the input terminal 111 is equal to the algebraic summation of these signals. As a matter of convenience, this latter voltage may be referred to as an auxiliary signal or sum signal which varies in part according to the sign and magnitude of the input error signal and in part according to the sign and magnitude of the input error signal and in part according to the sign and magnitude of the internal error signal.

For the purpose of producing a signal which is proportional to the signal passing through the amplifier 40, and hence proportional to the controller internal error, a controller internal error detector 120 is provided which has an input terminal 121 coupled to the first stage of amplification of the amplifier 40, via the terminal 45 on the latter, the circuit being completed to ground through a resistor 124. Means are provided for amplifying the signal received at input terminal 121 which in turn is utilized to energize a primary winding 131 of a transformer 130 having a center tapped secondary winding 132. To accomplish this amplification, an amplifier tube 135 is provided having an input limiting resistor 136 and a cathode resistor 137. The output of the tube 135 is connected to the primary winding 131 of the transformer 130. Two half-wave A.-C. rectifier circuits are powered by the respective halves of the transformer secondary winding 132 and the two circuits have a common unidirectional current connection to the center tap through a secondary winding 142 of a second transformer 140 which has a primary winding 141 supplied by the A.-C. line. Rectification is accomplished by a pair of diodes 143 and 144 which are connected to the respective ends of the center tapped secondary winding 132, the half-wave rectified output voltages being filtered by capacitors 145 and 146 which are paralled with the anti-reset controller output resistors 115 and 116. Because of the filtering effect of the capacitors 145 and 146, substantially steady D.-C. voltage drops are produced across the output resistors 115 and 116, the voltages developed across the output resistors being in opposition, i.e., bucking each other, due to the arrangement of the two half-wave rectified A.-C. circuits.

In the absence of an error signal passing through the amplifier 40, i.e., in the absence of an internal error signal, a fixed A.-C. voltage, induced in the secondary winding 142 of the transformer 140 by the application of the A.-C. line signal to the primary winding 141, is rectified by the diodes 143 and 144 causing a half-wave rectified A.-C. current to flow in opposite directions in the two half-wave rectified A.-C. circuits so that equal voltages are developed across the output resistors 115 and 116 which cancel each other. When a signal passes through the amplifier 40 indicating controller internal error, the portion of the signal tapped from the amplifier 40, via the terminal 45 on the latter, is amplified by the amplifier tube 135 and the amplified signal energizes the primary winding 131 of the transformer 130 causing a voltage to be induced in the center tapped secondary winding 132. The voltage induced in one half of the center tapped secondary winding 132 reenforces or aids the fixed voltage provided in the secondary winding 142 of the transformer 140 so that the voltage developed across the associated output resistor is increased while the voltage induced in the other half suppresses or bucks the fixed voltage so that the voltage developed across the other output resistor is reduced. Since the voltages developed across the resistors 115 and 116 oppose or buck each other, a voltage difference is provided thereacross which is algebraically added to the error input signal provided at the output terminal 13 of the recorder 10 and the algebraically summed voltage is applied to the input terminal 111 of the zener diode 110.

In carrying out the present invention, the double anode zener diode 110 may be of the type commercially available as 1N475 and may be chosen to have a zener voltage of approximately 7 volts in both directions, i.e., ±7 volts. Whenever the difference between the reference voltage (5 volts) and the algebraic summation of the error input signal and the internal error signal exceeds the breakdown voltage of the zener diode 110 (7 volts), the latter becomes conductive so that a resultant anti-reset voltage is applied to the central terminal between the resistors 108 and 109 of the reference voltage divider. Since the resistance of the resistors 108 and 109 is relatively high and since the output terminal 112 of the zener diode 110 is connected in parallel with the reference voltage source, the anti-reset voltage causes the value of the voltage supplied to the reset unit, via the line 113, to vary above and below the five volt reference level so that reset action is inhibited. The anti-reset voltage may thus be viewed as having a magnitude which increases or decreases the voltage on the line 113 above or below the normal reference value of five volts, there being no anti-reset action when the line 113 is at a five volt potential.

In order to prevent the development of an excessive voltage across the reset capacitor 103, a zener diode 150 is connected across resistor 109 of the reference voltage divider which limits the voltage that may be applied to the reset capacitor 103. In the present instance, the zener diode 150 is of the type commercially available as 1N715 having a zener voltage of approximately 10 volts. Thus, the maximum reset inhibiting voltage that may be applied to the left-hand terminal of the capacitor 103 is ten volts which is equal to the maximum voltage that may be applied to the right-hand terminal of the capacitor by the controller. The fixed rectified A.-C. voltage provided across the secondary winding 142 is deliberately made larger than the maximum voltage that may be applied to the reset capacitor 103 by the controller so that the maximum reset inhibiting voltage may be obtained with all desired proportional bands. Conversely, when the anti-reset voltage is driven below zero volts, the zener diode 150 conducts in its forward direction so that the reset inhibiting voltage may not go below zero volts, which is the minimum voltage supplied to the reset capacitor 103 by the output of the controller.

It is important to understand that with a given input error, the anti-reset voltage or reset inhibiting voltage is determined by the auxiliary closed loop formed by means of the internal error detector 120, the anti-reset controller 117, the line 113, the reset unit 100, the rate unit 90, the modulator 30, and the first stage of the amplifier 40. This loop action is of the essence in permitting resetting to output limits (0% and 100%) when inhibiting is taking place. Self-regulation of the loop occurs in the following manner: a decrease in feedback signal at 102 due to buildup of the voltage signal on the capacitor 103 causes the internal controller error to increase. This causes the internal error detector output to increase thereby causing a greater input voltage to be applied to input terminal 111 of the zener diode 110 which causes an increase in the voltage along line 113 and hence reduces the assumed decrease at 102 and simultaneously regulates the voltage across the capacitor 103.

For a proportional band which is less than the input error span, it is not desirable to fully inhibit reset action only until the limits of the input error span but rather it is desirable to fully prevent such reset action until the limits of the proportioning band are reached. By delaying or inhibiting the reset action until the limits of the proportioning band are reached (as the system corrects from a large error toward equilibrium), preintegration is inhibited. In setting forth the operation of the instant circuit to inhibit preintegration, let it be assumed that the maximum internal error voltage provided across the resistors 115 and 116 in the anti-reset controller 117 is 20 volts. Assuming the error input span is greater than the proportional band and that 6.5 volts is provided at the output terminal 13 of the recorder, the controller will initially operate outside the proportional band and, with zero rate and reset, a maximum output (100%) is provided by the controller which provides a maximum signal of 10 volts to the right-hand terminal of capacitor 103 and a maximum signal is transmitted from the amplifier 40 to the controller internal error detector 130. Under these conditions, the maximum internal error voltage of 20 volts is provided across the resistors 115 and 116 which is added to the error input signal so that 26.5 volts is applied to the input terminal 111 of the zener diode 110 which causes the zener diode 110 to be rendered conductive, since the 26.5 volts exceeds the summation of the zener voltage of 7 volts and the reference voltage of 5 volts applied to the output terminal 112. The anti-reset voltage thus created on the conductor 113 would normally by 19.5 volts (i.e., the difference between the voltage applied to the input terminal 111 of the zener diode 110 and the breakdown voltage thereof), however, this voltage is limited to 10 volts by the breakdown of the 10 volt zener diode 150. The 10 volt reset inhibiting voltage is applied via conductor 113 and resistor 104 to the left side of the reset capacitor 103 and, since 10 volts is applied to the right side through terminal 101 by the controller which is providing 100% output, no charge is developed in the reset capacitor 103 and no reset action takes place. This is known as complete reset inhibition and will continue until the algebraic summation of the error input signal and the internal error signal decreases sufficiently so that the reset inhibiting voltage falls below the 10 volt upper reset inhibiting limit determined by the zener diode 150. When the anti-reset voltage provided at the output terminal 112 of the zener diode 110 is equal to the 10 volt upper reset inhibiting limit, the limit of the proportioning band will have been reached. Subsequently, partial reset inhibition will occur until the algebraic summation of the error input signal and the controller internal error signal decreases such that the zener diode 110 is no longer rendered conductive i.e., until the algebraic sum of the input error signal (on wiper 13) and the internal error signal (across resistors 115, 116) falls below seven volts (the breakdown voltage of zener diode 110). At this time, the reference voltage of 5 volts will again be applied to the left side of the reset capacitor 103 by the reference voltage divider.

Experience with the above control arrangement shows that progressive inhibiting of the reset circuitry in accordance with the control function described above brings about a substantial improvement in operation of a control circuit under start-up conditions and with reset windup being substantially eliminated. Additionally, preintegration as a result of the error input span being greater than the proportional band is eliminated and the arrangement is, moreover, free of the disadvantages associated with prior attempts to solve such start-up problems.

With the above teachings in mind, the operation of the control system described above will be apparent to one skilled in the art. It will be understood first of all that during normal "on line" conditions, with the system in equilibrium at the control set point, a certain output is produced depending upon the load and the three mode response—proportional, rate, and reset—are present by means of normal action of the feedback loop. Thus, the signal at the output of the rate circuit is proportional to the voltage at the input. Similarly, the reset circuit responds so that with the normal reference voltage of 5 volts applied to the reset control line 113, the average voltage appearing at the output of the reset unit is independent of the average voltage at the input 101.

By contrast, the start-up condition may be considered, assuming that the system is applied to a batch heating device and that the process requires raising the temperature rapidly to a set point where such temperature is to be maintained. For the sake of illustration, it will also be assumed that the maintenance of the set point imposes a load requiring 50% of the controller output and that the proportioning band unit 20 is set to produce a proportioning band less than the input error span.

When the system is turned on and the recorder 10 is set for a large increase in set point, the slider on the slide wire 12 is immediately driven to the end of its range producing a maximum output. This large input error signal acting upon the amplifier causes the amplifier to produce the maximum output of which it is capable. Under such conditions, the internal error is in excess of the normal level such that the voltage provided across the output resistors 115 and 116 of the anti-reset controller 117 is at a maximum (for example, 20 volts as previously set forth). Because of the high output, the voltage at terminal 83 of the output voltage divider tends to be maximum.

In the absence of the present invention, the relatively high voltage, say on the order of 10 volts applied to the right side of the capacitor 103, compared to the reference voltage of 5 volts on the other side would tend to charge the capacitor and, upon persistence of the condition, the voltage across the capacitor would rise to the level of 5 volts. Stated in other words, in the absence of the present invention, a reset signal of approximately 5 volts would be developed in the reset unit 100. Such a high value of reset signal on start-up carries the severe penalty discussed above. It will be seen, however, that in the present device such reset signal is effectively defeated by an anti-reset voltage signal or a reset inhibiting signal being provided on the conductor 113 as previously described hereinabove. Specifically, the voltage on the conductor 113 will tend to rise from its normal voltage of 5 volts to a maximum voltage of 10 volts which would be the value obtained if reset were not employed. The added voltage, 5 volts, constitutes the anti-reset signal and, as a result of the anti-reset signal, a voltage of 10 volts is applied to the left-hand side of the capacitor 103. This is compared with the 10 volts applied to the right-hand side of the capacitor so that the net voltage appearing across the capacitor is zero. In other words, because of the action of the anti-reset circuitry, the reset signal is inhibited. This is to be contrasted with the high value of reset signal which would normally be expected under start-up conditions. As a result of the continued high output of the controller, acting upon the load 80, the condition gradually ascends in the direction of the set point.

After the edge of the slide wire input error span is reached, the reset action is still inhibited as previously set forth. Subsequently, when the error is reduced sufficiently to fall within the proportional band, the anti-reset signal is progressively and correspondingly reduced such that the voltage provided on conductor 113 progressively decreases below the 10 volt reset inhibiting limit level so that partial reset action takes place. As the set point is approached more closely, the anti-reset signal continues to decrease so that more and more reset action is permitted and the amount of input error signal decreases so that the controller output approaches the fifty percent equilibrium level. Before the input error signal reaches zero, or more specifically when the sum of the input error signal and the internal error signal falls below the seven volt breakdown level of Zener diode 110, the anti-reset signal goes to zero, and all reset inhibition ceases. Within a short time thereafter, and with the reset means now fully effective the condition reaches the set point asymptotically and without overshoot. At this time, the input error signal is zero, the controller output is at the fifty percent level, the amplifier is at normal signal level, the anti-reset signal is zero, and the reset signal returns to zero. The completes a step cycle of operation following a large step change.

It will be apparent that the present control system produces optimum performance in the face of large step changes, and this is true regardless of whether the step changes are above or below the set point. It is particularly noted that the improved operation has been brought about without making any changes in the system which would tend to degrade the performance under "on line" conditions or where small step changes are made in the set point. Moreover, it can be shown that optimum performance is secured for all the various control conditions regardless of the time constant of the process being controlled and without necessity for making any adjustments other than the normal adjustments which are made in a conventional controller when it is put into operation.

As previously set forth hereinabove, the reference voltage level is selected such that under steady state conditions, or normal operating conditions, the controller output is at a 50% level. Under certain circumstances, it may be desirable for the output under normal operating conditions to be at a level other than 50%.

Therefore, in accordance with another aspect of the invention, means are provided for shifting the reset reference voltage level such that the same reset action may be obtained at any desired output level and such that the controller senses the output as being at a 50% level. Referring to FIG. 2, a simplified schematic diagram of a reset adapter circuit is illustrated which may be substittued for the zener diode 150 in FIG. 1. The reset adapter circuit includes a zener diode 150A which is identical to the zener diode 150 in FIG. 1. However, one terminal of the zener diode 150A is not connected to ground as is one terminal of the zener diode 150 but rather the terminal is connected to a variable voltage divider which consists of a variable tapped resistor having its opposite ends respectively connected to a −5 volts and a +5 volts, the opposite ends also being connected to ground through capacitors 161 and 162 which are filters used when rectified A.-C. voltage is employed as the biasing voltage.

With the reset adapter circuit, the reset inhibiting voltage limits may be adjusted to cover any 10 volt range between −5 volts and +15 volts as determined by the effective forward and reverse "breakdown" voltages of the zener diode 150A. This circuit has a similar effect on the automatic controller as would occur if the reset reference voltage were shifted. Thus with this circuit, the steady state controller output may be set at any desired level and is not limited to the 50% level mentioned hereinabove.

In view of the above, it should be noted that a reset adapter circuit may be added to the automatic controller circuit for shifting the reset reference voltage created by the voltage divider 108, 109 and normally applied to the left side of the capacitor 103, rather than shifting the reset inhibiting voltage limits by means of the zener diode 150A and the circuit of FIG. 2. Such a reset adapter circuit would include means for negating the effect of the reset reference change on the feedback of the reset unit 100 so that the controller would sense the output as being at a 50% level.

Accordingly, the claims reciting means for compensating for changes in the steady state output level are intended to cover any reset adapter circuit which would accomplish this desired function. Additionally, the term "zener," as used in the claims, is to be interpreted to include equivalent devices having substantially the same input and output characteristics.

I claim as my invention:

1. In an automatic control system having improved response upon making large step changes between the set point and the controlled condition, the combination comprising means to generate an input error signal which varies in sense and magnitude according to the difference between the values of the set point and the controlled condition, reset means to generate a reset signal which normally varies in sign and magnitude according to a time integral function of said difference, control means coupled to receive as inputs at least said error signal and said reset signal for producing an internal error signal which varies in joint dependency upon such inputs, said control means including means to correctively restore the controlled condition to the set point with proportional plus reset action, means coupled to receive said input error signal and said internal error signal for producing a sum signal wihch varies in sense and magnitude according to the sense and magnitude of the algebraic sum of such error signals, means coupled to receive and responsive to said sum signal for inhibiting said reset means and reducing said reset signal, and means for limiting the maximum and minimum magnitudes of said sum signal to predetermined values.

2. In an automatic control system having improved response upon making large step changes between the set point and the controlled condition, the combination comprising control means having an input device and an output device with an amplifier connected therebetween, said input device having means to generate and couple into said amplifier an input error signal which varies in sense and magnitude according to the sign and magnitude of the error difference between the valves of the set point and the controlled condition, said output device having means connected to the amplifier output for correctively restoring the controlled condition to the set point with proportional action, said control means further having reset means for producing a reset signal which normally varies as a time integral function of said error difference and for coupling such reset signal into said amplifier so that the control means normally functions with proportional plus reset action, said amplifier thereby producing an internal error signal which differs from said input error signal, means coupled to receive said input error signal and said internal error signal for producing a sum signal which varies in sense and magnitude according to the sense and magnitude of the algebraic sum of such error signals, means coupled to receive and responsive to said sum signal for inhibiting said reset means and reducing said reset signal, and means for limiting the maximum and minimum magnitudes of said sum signal to predetermined values.

3. In an automatic control system having improved response upon making large step changes between the set point and the controlled condition, the combination comprising control means having an input device and an output device with an amplifier connected therebetween, said input device having means to generate and couple into said amplifier an input error signal which varies in sense and magnitude according to the sign and magnitude of the error difference between the values of the set point and the controlled condition, said output device having means connected to the amplifier output for correctively restoring the controlled condition to the set point with proportional action, said control means further having reset means for producing a reset signal which normally varies as a time integral function of said error difference and for coupling such reset signal into said amplifier so that the control means normally functions with proportional plus reset action, said amplifier thereby producing an internal error signal which differs from said input error signal, means coupled to receive said input error signal and said internal error signal for producing a sum signal which varies in sense and magnitude according to the sense and magnitude of the algebraic sum of such error signals, means coupled to receive said sum signal and to produce an anti-reset signal which varies in sense and magnitude according to the sense and magnitude of the amount by which said sum signal exceeds a predetermined threshold magnitude, means for limiting the maximum and minimum magnitudes of said anti-reset signal to predetermined values, and means coupled to receive and responsive to said anti-reset signal for inhibiting said reset means and reducing said reset signal according to the magnitude of the anti-reset signal.

4. In an automatic control system having improved response upon making large step changes between the set point and the controlled condition, the combination comprising control means having an input device and an output device with an amplifier connected therebetween, said input device having means to generate and couple into said amplifier an input error signal which varies in sense and magnitude according to the sign and magnitude of the error difference between the values of the set point and the controlled condition, said output device having means connected to the amplifier output for correctively restoring the controlled condition to the set point with proportional action, said control means further having reset means for producing a reset signal which normally varies as a time integral function of said error difference and for coupling such reset signal into said amplifier so that the control means normally functions with proportional plus reset action, said amplifier thereby producing an internal error signal which differs from said input error signal, means coupled to receive said input error signal and said internal error signal for producing a sum signal which varies in sense and magnitude according to the sense and magnitude of the algebraic sum of such error signals, means coupled to receive and responsive to said sum signal for creating an anti-reset signal which varies in magnitude according to the amount by which the sum signal exceeds a predetermined threshold magnitude, means for limiting said anti-reset signal to a predetermined maximum magnitude even though said sum signal exceeds a corresponding value, and means coupled to receive and responsive to said anti-reset signal for inhibiting said reset means and reducing said reset signal.

5. In an automatic control system having improved response upon making large step changes between the set point and the controlled condition, the combination comprising control means having an input device, an amplifier, and an output device connected in tandem, said input device having means to generate and couple into said amplifier an input error signal which varies in sense and magnitude according to the sign and magnitude of the error difference between the values of the set point and the controlled condition, said output device having means connected to the amplifier output for correctively restoring the controlled condition to the set point with proportional action, said control means further having reset means for producing a reset signal which normally varies as a time integral function of said error difference and for coupling such signal into said amplifier so that the control means normally functions with proportional plus reset action, said amplifier thereby producing an internal error signal which differs from said input error signal, means coupled to receive and responsive at least in part to said internal error signal for producing a variable anti-reset signal, means coupled to receive and responsive to the magnitude of said anti-reset signal for inhibiting said reset means and correspondingly reducing said reset signal, and means for limiting the span over which said anti-reset signal may vary, thereby to avoid preintegration.

6. The combination set forth in claim 5, further characterized in that said last-named means includes means for shifting the range of absolute values spanned by said anti-reset signal as it varies over its limited span, thereby to afford compensation for changes in the steady state output of the controller under different loading conditions.

7. In an automatic control system for adjusting a controlled condition and maintaining it at a set point value, the combination comprising means for generating an input error signal which varies in sense and magnitude according to the sign and extent of the difference between the value of the set point and the controlled condition, reset means for generating a reset signal which normally varies in sense and magnitude according to a time integral function of said difference, a controller coupled to receive as inputs said input error signal and said reset signal and having means for producing an internal error signal which varies according to a combined function of such inputs, said controller having means for correctively restoring the controlled condition to the set point with proportional plus reset action, means coupled to receive and responsive at least in part to said internal error signal for creating a variable anti-reset signal, means coupled to receive and responsive to said anti-reset signal for inhibiting said reset means, and means for restricting the amount of reset inhibition to a predetermned maximum value.

8. In an automatic control system for adjusting a controlled condition and maintaining it at a set point value, the combination comprising means for generating an input error signal which varies in sense and magnitude according to the sign and extent of the difference between the value of the set point and the controlled condition, reset means for generating a reset signal which normally varies in sense and magnitude according to a time integral function of said difference, a controller coupled to receive as inputs said input error signal and said reset signal and having means for producing an internal error signal which varies according to a combined function of such inputs, said controller having means for correctively restoring the controlled condition to the set point with proportional plus reset action, means coupled to receive and responsive at least in part to said internal error signal for creating a variable anti-reset signal, means coupled to receive and responsive to said anti-reset signal for inhibiting said reset means and reducing said reset signal by an amount substantially proportional to the magnitude of said anti-reset signal, and means for limiting the reduction of said reset signal to a predetermined maximum amount.

9. In an automatic control system for adjusting a controlled condition and maintaining it at a set point value, the combination comprising means for generating an input error signal which varies in sense and magnitude according to the sign and extent of the difference between the value of the set point and the controlled condition, reset means for generating a reset signal which normally varies in sense and magnitude according to a time integral function of said difference, said reset means including a capacitor across which said reset signal appears as a voltage, a controller coupled to receive as inputs said input error signal and said reset signal and having means for producing an internal error signal which varies according to a combined function of such inputs, said controller having means for correctively restoring the controlled condition to the set point with proportional plus reset action, means coupled to receive and responsive at least in part to said internal error signal for creating a variable auxiliary voltage signal, means including a zener diode coupled to receive said auxiliary voltage for producing an anti-reset voltage which varies in proportion to said auxiliary voltage up to a predetermined maximum value, means coupling said anti-reset signal to said capacitor for correspondingly reducing the magnitude of the reset signal thereacross, thereby to inhibit reset action while avoiding preintegration.

10. In an automatic control system having improved response upon making large step changes between the set point and the controlled condition, the combination comprising means for generating an input error signal which varies as the difference between the values of the set point and the controlled condition, reset means for creating a reset signal which normally varies according to a time integral function of said difference, a controller coupled to receive as inputs said input error signal and reset signal and having means responsive thereto for creating an internal error signal which varies in joint dependency upon such inputs, said controller having means for correctively changing the controlled condition to reduce said difference substantially to zero with proportional plus reset action, means coupled to receive and responsive at least in part to said internal error signal for producing an auxiliary signal which varies in magnitude under the influence of said internal error signal, means coupled to receive and responsive to said auxiliary signal for producing an anti-reset signal which varies in proportion to the amount by which the auxiliary signal exceeds a predetermned threshold magnitude and which becomes constant at a predetermined maximum when the auxiliary signal exceeds a predetermined higher magnitude, and means for coupling said anti-reset signal to said reset means to reduce the magnitude of said reset signal substantially in proportion to the magnitude of said anti-reset signal.

11. In an automatic control system having improved response upon making large step changes between the set point and the controlled condition, the combination comprising means for generating an input error signal which varies as the difference between the values of the set point and the controlled condition, reset means for creating a reset signal which normally varies according to a time integral function of said difference, a controller having coupled to receive as inputs said input error signal and reset signal and having means responsive thereto for creating an internal error signal which varies in joint dependency upon such inputs, said controller having means for correctively changing the controlled condition to reduce said difference substantially to zero with proportional plus reset action, means coupled to receive and responsive at least in part to said internal error signal for producing an auxiliary signal which varies in magnitude under the influence of said internal error signal, means coupled to receive and responsive to said auxiliary signal to produce an anti-reset signal which varies in proportion to the amount by which the auxiliary signal exceeds a predetermined threshold magnitude, means for limiting said anti-reset signal to a predetermined maximum magnitude even though said auxiliary signal otherwise tends to make it exceed such maximum, and means for coupling said anti-reset signal to said reset means to reduce the magnitude of said reset signal substantially in proportion to the magnitude of said anti-reset signal.

12. In an automatic control system having improved response upon making large step changes between the set point and the controlled condition, the combination comprising means for generating an input error signal which varies as the difference between the values of the set point and the controlled condition, reset means for creating a reset signal which varies according to a time integral function of said difference, a controller having coupled to receive as inputs said input error signal and reset signal and having means responsive thereto for creating an internal error signal which varies in joint dependency upon such inputs, said controller having means for correctively changing the controlled condition to reduce said difference substantially to zero with proportional plus reset action, means coupled to receive and responsive to said input error signal and said internal error signal for producing a sum signal which varies as the algebraic sum of such error signals, means coupled to receive said sum signal and responsive thereto to produce an anti-reset signal which varies in proportion to the amount by which the auxiliary signal exceeds a predetermined threshold magnitude, means for limiting said anti-reset signal to a predetermined maximum magnitude which is less than the magnitudes it would otherwise reach, and means for coupling said anti-reset signal to said reset means to reduce the magnitude of said reset signal substantially in proportion to the magnitude of said anti-reset signal.

References Cited by the Examiner
UNITED STATES PATENTS

| | | | |
|---|---|---|---|
| 2,830,245 | 4/1958 | Davis et al. | 236—78 |
| 2,835,450 | 5/1958 | Brown et al. | 328—3 |

JOHN W. HUCKERT, *Primary Examiner.*

ARTHUR GAUSS, *Examiner.*